United States Patent [19]

Burén et al.

[11] Patent Number: 4,571,261

[45] Date of Patent: Feb. 18, 1986

[54] METHOD FOR RECOVERING LEAD FROM WASTE LEAD PRODUCTS

[75] Inventors: Kurt J. A. Burén, Skelleftehamn; Martin L. Hedlund, Ursviken; Malkolm S. Lundström, Skellefteå, all of Sweden

[73] Assignee: Boliden Aktiebolag, Stockholm, Sweden

[21] Appl. No.: 624,193

[22] Filed: Jun. 25, 1984

[30] Foreign Application Priority Data

Jul. 13, 1983 [SE] Sweden ................................ 8303963

[51] Int. Cl.[4] .............................................. C22B 13/00
[52] U.S. Cl. ......................................................... 75/77
[58] Field of Search ............................................ 75/77

[56] References Cited

U.S. PATENT DOCUMENTS 4,017,308  4/1977  Peterson et al. ......................... 75/77
4,211,557  7/1980  Sychev et al. ........................... 75/77
4,340,421  7/1982  Bergsoe .................................... 75/77

FOREIGN PATENT DOCUMENTS 2949033  6/1981  Fed. Rep. of Germany .

OTHER PUBLICATIONS

"The New Secondary Lead Smelter of Simsmetal Pty., Ltd., Brooklyn, Victoria, Australia", from *Advances in Extractive Metallurgy* (1977), pp. 105–110, by L. A. Lyons et al.

Chemical Abstracts, 75:8726k, 1971.
Chemical Abstracts, 90:9647g, 1979.
Chemical Abstracts, 93:243334m, 1980.
Chemical Abstracts, 93:243437x, 1980.

*Primary Examiner*—Melvyn J. Andrews
*Attorney, Agent, or Firm*—Burns, Doane, Swecker & Mathis

[57] ABSTRACT

The invention relates to a method for recovering lead and lead-alloying elements from battery-type lead waste products, and fractions thereof, such as battery mud, and similar oxidic-sulphatic materials.

In accordance with the method, the waste products, together with a solid reduction agent, are introduced to a furnace in which the contents thereof can be vigorously agitated. The amount of solid reduction agent charged is selected so as to ensure the chemical reduction of substantially all the non-metallic lead contained by the waste products, and the alloying elements present therein. The material charged to the furnace is heated to a temperature of between about 1050° C. and 1250° C., while vigorously agitating the furnace contents, so as to melt, split-off and chemically reduce the waste products, to form a lead melt containing the aforementioned alloying elements.

The furnace used is preferably a top-blown rotary converter of the Kaldo type, in which the furnace contents can be agitated by rotating the furnace.

18 Claims, No Drawings

METHOD FOR RECOVERING LEAD FROM WASTE LEAD PRODUCTS

The present invention relates to a method for recovering lead and lead-alloying elements from such waste lead products as battery scrap, battery mud and other oxidic-sulphatic materials. The invention particularly relates to a method for melting and chemically reducing said waste products, while expelling sulphur therefrom, in the form of sulphur dioxide, and transforming the metals and other alloying elements present in the waste products, to a molten lead bath.

A substantial part of present day lead manufacture is produced from secondary material, such as battery scrap. Used vehicle batteries, and other lead-containing accumulators can be processed to recover the lead content of the metal components of the battery, for example, the battery plates, grids and casings, and from the oxidic-sulphatic lead compounds forming the active material on the battery plates. This constituent of the battery scrap, present in the form of a thick mass, is generally referred to as battery mud.

Thus, it is known to process consumed lead batteries, by subjecting the batteries to purely pyrometallurgical processes, in which the batteries, optionally after being emptied of the battery liquid, are introduced into differing kinds of furnace units, for example shaft furances, reverberatory furnaces, or slowly rotating drum furnaces, for example of the short drum furnace or the cement kiln type.

The worn-out batteries may also be processed by first subjecting said batteries to a mechanical phase, including the steps of crushing, separation and classification, in which steps the battery mud can be sorted out quantitatively from other battery material, and then treated in some suitable manner. One such method for mechanically processing worn-out batteries is described, for example, in DE-B Nos. 1 224 935 and 1 533 129. Normally, the resultant paste is first dried and then agglomerated and smelted in a reverberatory furnace, in which the lead compounds are reduced to lead and the sulphur is converted to a lead-iron-sulphide melt (lead matte), by adding iron to the molten bath, and the matte removed. A method for working-up the mud without agglomerating the same is described in U.S. Pat. No. 4,102,676, in which method the mud is first dried and screened and then heated by means of a flame under strongly reducing conditions, which are maintained by only partially combusting the gaseous fuel, whereupon droplets of lead and slag are collected in a reactor vessel arranged beneath the flame. In order to avoid problems associated with the formation of sulphur-containing products, it is proposed to first treat the mud with ammonium carbonate, in order to remove sulphur.

When processing battery scrap in a shaft furnace, the scrap is charged to the furnace while mixed with coke lumps. As with the reverberatory furnace smelting process, iron is added to take up the sulphur content. In this case there is obtained a lead bullion which contains alloying elements, such as antimony, a lead matte, and a shaft-furnace slag, approximately half of which is returned to the process. One serious disadvantage with such shaft-furnace processes is that the process requires the charge to be in lump form and an excessive amount of slag to be returned to the system. Such processes are also encumbered with practical difficulties, such as separation of the lead matte from the shaft-furnace slag, and difficulties in processing the slag in order to recover its lead content, which may reach to about 15%.

Concentrated battery scrap, which in principle includes the mud together with metallic constituents, can also be worked-up in electrofurnaces, reverberatory furnaces, or slowly-rotating drum furnaces of the aforementioned kind. In this case, the scrap is melted down in the presence of coal or coke and iron, together with an alkaline flux, normally soda, the purpose of which is to produce a sufficiently fluid slag and, in addition, to bind sulphur to the greatest extent possible, so as to avoid the formation of the lead matte and therewith reduce lead losses. One serious disadvantage associated with these known methods, however, is that the alkali-containing slag, due to its high solubility in water, cannot be dumped without risk of contaminating the ground with heavy metals.

In our earlier Swedish Patent Specification SE-A No. 7317217, corresponding to U.S. Pat. No. 4,017,308, we propose a two-stage method for processing battery scrap in a top-blown rotary converter, in which method the metal is first smelted to form an oxidic melt, which is reduced in a second step with coke or some other suitable reduction agent, while vigorously rotating the converter. In a normal operating plant, the time taken to effect a full smelting cycle, including the time taken to charge and tap the converter, is approximately 5.5 hours. Despite the fact that with regard to the materials concerned and the favourable environmental conditions afforded this method repesents an important step forward in the art vis-a-vis known established methods for the processing of battery scrap, the method is still unable to complete economically with regard to the handling of said materials, owing to the relatively long smelting cycle, and therewith the relatively high energy costs.

Surprisingly, it has been found possible to substantially eliminate the disadvantages associated with earlier known methods for processing waste lead products of the kind aforedescribed, by means of the method according to the invention. The novel method according to the invention also affords far greater flexibility in the selection of waste products suitable for processing, since it is not critical or necessary to separate metallic or organic material from the battery mud, and neither is it necessary to agglomerate the mud when said mud is to be processed separately. Thus, the method enables both non-separated battery scrap and battery mud to be processed, either together or separately.

The characterizing features of the method according to the invention are set forth in the following claims. Thus, when practicing the method according to the invention it is essential to charge the waste products together with a solid reduction agent, suitably finely-divided coke having a particle size of beneath 20 mm, and to heat the charged material to a temperature of between about 1050° C. and 1250° C. while vigorously agitating said charge. By charging the reduction agent in an amount such as to ensure that substantially all the non-metallic lead content of the charge and the non-metallic alloying elements present therein are reduced to metallic lead, there is obtained by heating a molten lead phase which also dissolves the alloying elements reduced out. During the heating process, the sulphates and basic sulphates are also split-off during reduction, so as to form sulphur dioxide and lead oxide, which in turn is reduced to lead metal by the solid reductants present in the charge.

The sulphur dioxide formed when processing the charge can be eliminated from the resultant gas in various ways, for example by absorption with lime (lime scrubber) or in cold water or a citrate solution, from which sulphur dioxide can be stripped with gas or water vapour, for the manufacture of sulphur dioxide, or by passing the gas to a sulphuric acid plant.

Assuming that the charged material are of the aforementioned type, and of the type given in the claims, no flux is required, since it has surprisingly been found that the melt can be handled without requiring a slag to be formed. In addition to containing sulphur in sulphate form, the waste lead products suitable for processing in accordance with the invention may also contain substantial amounts of one or more elements within the group arsenic, antimony, calcium, tin and like elements which are dissolvable in lead. In addition to being obtained in the form of concentration products and battery mud, such products can also be obtained in the form of, for example, leaching residues and leaching mud from zinc-manufacturing processes.

The method according to the invention can be carried out in any furnace unit in which the smelting process can be effected while agitating the charge and the melt. For example, it is possible to utilize a substantially vertically arranged converter-type reactor vessel, for example a reactor of the LD or OBM type, the solid charge and melt being agitated pneumatically, with the aid of a gas passed through the melt. The gas can be introduced, for example, through lances or tuyers arranged at the bottom of the converter. Stationary converters of this kind, however, are impractical, particularly with respect to the difficulties encountered in effectively agitating the charge when waste products in lump form are to be processed. Because of this the charge and melt are preferably agitated mechanically, by utilizing instead a top-blown rotary converter, for example of the Kaldo type, where agitation is effected by rotating the converter, which is more effective in the case of an inhomogeneous charge comprising a large percentage of solid, coarse material where intermixing of the solid material is also essential. A suitably balanced agitation is obtained when the converter is rotated at a peripheral speed of about 0.5–3 m/s, measured on the inner surface of the converter.

The charge is suitably heated by means of an oil-oxygen burner. The best results have been obtained, with the lowest oil consumption, when the burner was operated with an oxidizing flame.

It must also be mentioned, and emphasized, that battery scrap which contains a large amount of organic material, for example in the form of plastics battery casings, can be charged to the converter and processed within the scope of the method according to the invention. The organic material can be readily burned-off, or pyrolyzed, prior to or during the actual smelting phase, without disturbing the other reaction processes. Subsequent to being subjected to an introductory pyrolysis process or to a partial combustion process, the organic material can also be used as the sole reduction agent in the method, although in certain cases it may be necessary to supply coke to the converter. In the case of polypropylene battery casings, this plastics material being the most common material used, no residual products are obtained when practicing the method, while in the case of older batteries in which ebonite plastics are used there is obtained an aluminium-silicate residue, which may require the addition of a suitable fluxing agent, so as not to disturb the process.

The invention will now be described in more detail with reference to a preferred embodiment.

EXAMPLE 1

A top-blown, rotary converter of Kaldo type having an internal diameter of 2.5 m was charged with 12.5 tons of battery mud having the following principle analysis:

63.4%: Pb
0.58%: Sb
0.11%: As
6.4%: S (as sulphate)
8.1%: $H_2O$ together with one ton of coke comprising lumps of between 5 mm and 12 mm.

The charge was heated with an oil-oxygen burner to a doughy consistency, which took 20 minutes, calculated from the time at which charging was commenced. The converter was rotated at a speed of 2 r.p.m. during the actual charging period, and immediately thereafter. The rotary speed was then increased to 10 r.p.m. Subsequent hereto, a further charge comprising 12.5 tons of mud and 3 tons of coke were introduced into the converter, and heating was continued with an oxidizing flame while rotating the converter at a speed of 10 r.p.m. over a period of 155 min. In this way, if was possible to tap-off lead having a sulphur content of 0.5%, an antimony content of 1.2% and an arsenic content of 0.25%. In total, a time of 180 minutes was required to complete a full smelting cycle, including charging and tapping of the converter.

EXAMPLE 2

30 tons of lead batteries, which had been emptied of liquid and which were mainly of the polypropylene type, together with 10 tons of return dust were charged batchwise, 4 tons per charge, to a top-blown, rotary converter of the Kaldo type. The organic material in each part-charge was combusted with oxygen gas in the furnace, the supply of oxygen gas being controlled so as to maintain a reducing atmosphere in the converter. The waste-gases, rich in carbon monoxide, were afterburned with secondary air in a water-cooled waste-gas hood.

Each part-charge was combusted with an input of 7.5 $m^3$ of oxygen per minute, before introducing the next part-charge into the converter. Subsequent to charging all material to the converter and combusting said material therein, the converter contents were subjected to an afterburning process with the aid of oil-oxygen burners, to ensure complete combustion and smelting of the material in the conveter. Subsequent hereto, there was tapped-off a lead melt containing 3% Sb. The full smelting cycle, including charging and tapping-off the converter, took 280 minutes to complete.

We claim:

1. A method for recovering lead from lead storage battery scrap by reduction smelting comprising:
    (a) introducing a charge comprised of said lead storage battery scrap which contains non-metallic lead compounds including sulfate-containing compounds and a solid reducing agent in an amount sufficient to reduce substantially all of the non-metallic lead compounds present in the lead storage battery scrap into a furnace adapted to impart vigorous agitation to the contents thereof; and (b) directing a burner onto the charge to heat the charge to a temperature in the range of from 1050° C. to 1250° C. while vigorously agitating the charge whereby the lead storage battery scrap is melted, the sulfate-containing compounds in the charge are converted to sulfur dioxide which is removed from the furnace and a substantially sulfur-free lead melt containing the lead to be recovered is substantially simultaneously formed.

2. The method of claim 1 wherein the reducing agent is finely-divided coke having a particle size of less than 20 mm.

3. The method of claim 2 wherein said agitation is effected pnemuatically with the aid of a gas passed through the charge.

4. The method of claim 2 wherein the furnace is a top-blown rotary converter whereby agitation is effected by rotating the converter.

5. The method of claim 4 wherein the furnace is rotated at a peripheral speed of about 0.5–3 m/s calculated on the inner surface of the furnace.

6. The method of claim 5 wherein the burner is operated with an oxidizing oil-oxygen flame.

7. The method of claim 6 wherein the furnace is maintained within the temperature range of from 1050° C. to 1250° C.

8. The method of claim 7 wherein the lead storage battery scrap includes battery-casings of organic material which is at least partially combusted with oxygen in said furnace to form a carbonaceous residue that forms at least part of the solid reducing agent.

9. The method of claim 1 wherein said agitation is effected pneumatically with the aid of a gas passed through the charge.

10. The method of claim 1 wherein the furnace is a top-blown rotary converter whereby agitation is effected by rotating the converter.

11. The method of claim 4 wherein the burner is operated with an oxidizing oil-oxygen flame.

12. The method of claim 1 wherein the burner is operated with an oxidizing oil-oxygen flame.

13. The method of claim 1 wherein the burner is operated with pure oxygen.

14. The method of claim 1 wherein the burner is operated with air enriched with oxygen.

15. The method of claim 4 wherein the lead storage battery scrap includes battery-casings of organic material which is at least partially combusted with oxygen in said furnace to form a carbonaceous residue that forms at least part of the solid reducing agent.

16. The method of claim 1 wherein the lead storage battery scrap includes battery-casings of organic material which is at least partially combusted with oxygen in said furnace to form a carbonaceous residue that forms at least part of the solid reducing agent.

17. The method of claim 1 wherein the method is conducted in the absence of a flux.

18. The method of claim 1 wherein the lead melt is formed in the absence of a slag.

* * * * *